United States Patent [19]

Spooner

[11] 4,093,099

[45] June 6, 1978

[54] RECTANGULAR CONTAINER FOR THE AGING OF ALCOHOLIC BEVERAGES

[76] Inventor: James E. Spooner, 2360 A 46th St., Los Alamos, N. Mex. 87544

[21] Appl. No.: 612,342

[22] Filed: Sep. 11, 1975

[51] Int. Cl.² .................. B65D 9/12; B65D 25/00; B65D 61/00
[52] U.S. Cl. ...................................... 217/72; 217/69; 217/12 R; 217/65
[58] Field of Search .................. 217/72, 73, 69, 65, 217/43, 36, 45, 12 R, 13

[56] References Cited

U.S. PATENT DOCUMENTS

| | | | |
|---|---|---|---|
| 1,033,410 | 7/1912 | Jones | 217/12 R |
| 1,508,657 | 9/1924 | Hood | 217/69 |
| 2,961,113 | 11/1960 | Kienlen | 217/65 X |
| 3,064,848 | 11/1962 | Housley et al. | 217/69 |
| 3,456,827 | 7/1969 | Wakeem | 217/72 |

*Primary Examiner*—William Price
*Assistant Examiner*—Steven M. Pollard

*Attorney, Agent, or Firm*—Glenn K. Robbins

[57] ABSTRACT

A wooden box-like container for the aging of alcoholic beverages. The container is in the form of a box having six panels or sides in which any three mutually adjacent panels are mutually perpendicular to one another and join one another at a corner. Any one of the panels of a group of three mutually adjacent panels contacts one adjacent panel in face to edge relation and the third panel of the group in edge to face relation. Each of the corners are formed in this fashion and all of the panels are held together in tight box-like form by prestressing means. This preserves the liquid tight contact at the face to edge and edge to face junction of the panels. Where the panels meet a cubical gap is left which is plugged by plug means. The prestressing means may be in the form of clamps of headers connected by prestress rods provided with tightening nuts. To provide substantially uniform loading at the line of contact between the header of head and the panel the header member may be prestressed in a parabolic pattern.

3 Claims, 4 Drawing Figures

U.S. Patent
June 6, 1978
4,093,099
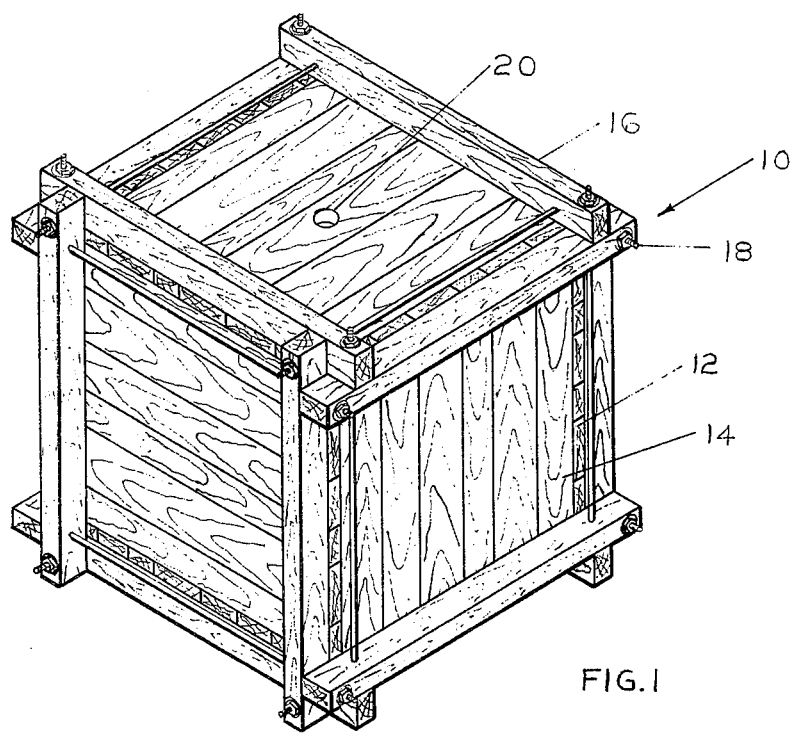
FIG.1
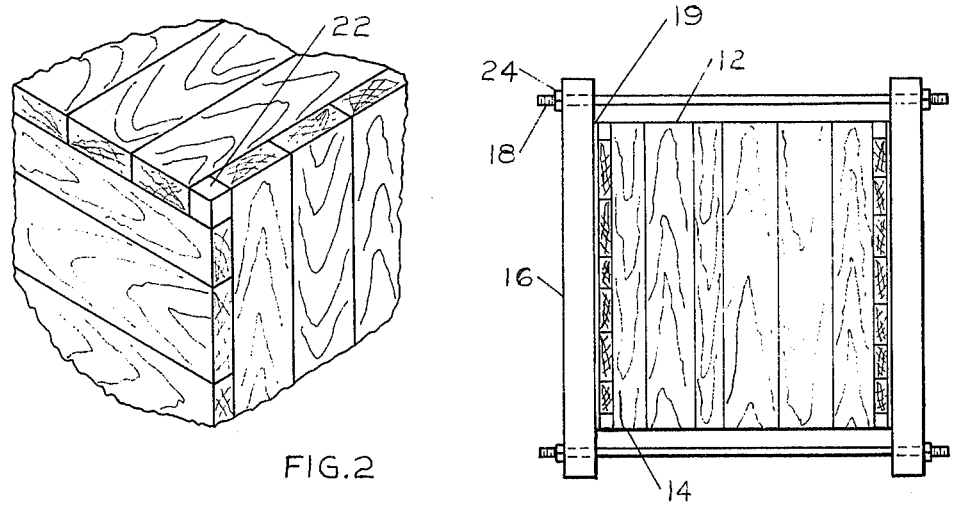
FIG.2
FIG.3
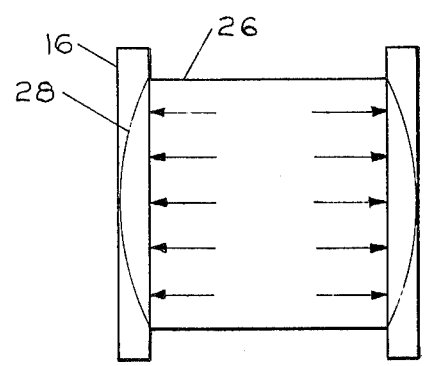
FIG.4

RECTANGULAR CONTAINER FOR THE AGING OF ALCOHOLIC BEVERAGES

BACKGROUND OF THE INVENTION

The use of wooden barrels as containers for beverages is time honored and with respect to alcoholic beverages such as wine, brandy, whiskey and the like, the barrel has several distinct functions. These functions may be summarized as storage, shipping, and aging. Aging will be taken as a complex of processes such as oxidation, extraction of flavor components and other time dependent physico-chemical processes that affect the sensory appreciation of the aged product. Long experience has indicated that this aging process is highly dependent upon the ratio of container surface to container volume, and this ratio is in the order of three square feet per cubic foot for many alcoholic beverages.

centuries of use of the barrel have resulted in a container that is admirably suited to storing and shipping. Even though it appears to be a simple and even crude device, the barrel utilizes the rather sophisticated concept of prestressing in order to maintain its shape and prevent leaking at the joints between the staves. As a result of the precision required in forming each piece, the skills required in the cooper's art are notable and require years to develop. As an alternative to this skill, a complex industrial process is necessary.

Since shipping is no longer a necessary function of barrels, the circular cross-section is not mandatory and the present invention is directed toward improving upon the storing and aging functions previously mentioned. While there have been many attempts at producing a non-circular "barrel" or container, those that were simple enough to be commercially acceptable have not worked well, and those that worked well have not been simple enough.

SUMMARY OF THE INVENTION

It is the primary objective of my invention to define a simple flat sided container suitable for aging alcoholic beverages. This configuration is suitable for easy manufacture by machine technique and the resulting cubical or other box-like shapes utilize storage space more efficiently than the traditional barrel. An additional objective will be to utilize both sides of the container wood in order to minimize the cost of aging beverages in "new" wood. Aging can be carried out in used containers, but there are situations such as with bourbon whiskey, brandy, and some wines where unused or "new" wood is preferable. In the case of bourbon it is also legally mandatory.

By means of this invention there has been provided a simply constructed wooden box-like container made up of six panels which in its simplest form may be in the form of a cube but it will be understood that four of the six sides may be elongated to form a box-like structure rather than a cubical box.

The six panels forming the box are assembled in a special fashion so that the corners defined by mutually adjacent panels perpendicular to one another have a special face to edge relationship. Thus any one panel of any three mutually adjacent panels contacts one adjacent panel in face to edge relation while the third panel is contacted in edge to face relation. All of the panels are held tightly close together in box-like form by a prestressing means to provide liquid tight contact at the face to edge and edge to face juncture of the panels.

The prestressing means may be in the form of a clamp provided by head members which bear against the opposed panels and hold an intermediate panel which is in edge to face relation with the opposed panels in prestressed relation. The clamping means may be effected by prestress rods passing over or through the heads and may be tightened by adjustable tightening nuts.

The panels which may be made of conventional and easily manufactured elongated parallel planar staves can be reused after break down as desired. The staves are interchangeable since they are all the same length and can be simply stacked when not in use.

Where the panels meet at the corner and because of the overlapping relationship provided by the face to edge and edge to face juncture, a cubical gap is left. This gap is plugged by a cubical plug such as a plug of cork or oak or other material which has the capability of slight swelling upon liquid contact.

In order to accomodate any slightly off-centered loading and distortion of the panel it may be desirable to provide a uniform line loading at the midplane of the panels. This may be effected by a wire rope passing over the head members in a parabolic pattern. Tensioning of the wire rope produces a uniform load at the line of contact between the head member and the panel.

The box-like beverage container of this invention is simply constructed without the requirement of any special tools and can be broken down when not in use likewise without any special equipment. The panels as individual staves when stave panels are employed can be stored with a minimum of space as can the box-like container as compared to conventional barrels. The panels are completely interchangeable to provide an improved box-like container for beverages and is relatively inexpensive in cost and manufacture.

The above features are objects of this invention and further objects will appear in the detailed description which follows and will otherwise be apparent to those skilled in the art.

For the purpose of illustration of this invention there is shown in the accompanying drawings a preferred embodiment thereof. It is to be understood that these drawings are for purpose of illustration only and that the invention is not limited thereto.

IN THE DRAWINGS

FIG. 1, is an isometric view partly broken away showing a box-like container and a header prestressing means.

FIG. 2, is an enlarged fragmentary isometric view of a corner of the box-like container.

FIG. 3, is a top plan view of the box showing the heads used as prestressed means, and FIG. 4, is a top plan view and stress diagram showing the parabolic loading.

DESCRIPTION OF THE INVENTION

The container of this invention is generally referred to by the reference nemeral 10 in FIG. 1. It is comprised of six panels or sides 12 constructed of flat staves 14 which are held together by heads 16 and prestressing rods 18.

The side panels 12 of the container are composed of individual straight wooden staves 14, preferably white oak, approximately 1-1¼ inches thick by 3-5 inches wide. The six panels are assembled in essentially mutually perpendicular planes to form a container of rectangular or square cross-sections. Note that for any three mutually adjacent panels, a given panel will contact one adjoining panel face to edge and the other adjoining panel edge to face. The panels 12 are held in position by a prestressing force applied by heads 16 in the plane of the panels. A bunghole and bung 20 are provided at any desired location.

FIG. 2 shows a cubical plug 22 that is used to seal the gap caused where the edge staves of adjoining panels meet to form a corner of the container. The plug 22 is slightly oversize with respect to the dimensions of the gap and composed of elastic material such as cork so that it will be compressed under the prestressing heads 16, thus effectively preventing any leakage at this point.

FIG. 3 shows a means of applying a nearly uniform compressive line load through the panel directly beneath the head and into the intervening panel between oposing heads. Threaded stress elements in the form of rods 18 stretching between heads 16 on opposite sides of the panel 12 are tensioned by tightening nuts 24 to a uniform torque. It will be understood that where desired cables having threaded ends may be used as the stress elements where desired.

The prestressing load in the panels may be made uniform by using a material 19 directly under the heads that flows under pressure, such as polyethylene at elevated temperatures, or crushes under uniform pressure, like styrofoam. Another technique involves buttering the contact surface of the head with a paste of plaster-of-paris which expands upon drying. The paste will flow as it expands under the tightened head so that irregularities in loading are redistributed. This prestressing force not only seals the joints between the staves of the intervening panel, but also performs the same function at the joint between the panels. Swelling of the wood when wetted will close any remaining passages.

FIG. 4 shows another means of loading which will produce a uniform line load applied at the center of the panels. A wire rope 26 passing over the head 16 in a parabolic pattern 28 is tensioned and because of the statics of this shape a uniform load is produced at the line of contact between the head and the panel. This loading can be positioned at the mid-plane of the intervening panel.

Although many attempts have been made toward perfecting a container having planar sides, analysis of these designs indicates that failure eventually occurs because the configuration will not accommodate all of the distortions which will occur. When wetted a wood stave will expand different amounts longitudinally and laterally, and a flat head set into the croze of a rectangular body will expand at a different rate than the sides parallel to the grain of the head. This difference is the source of leaks. Examination of the present invention will indicate that in-plane expansion in any direction will be accomodated and the contact at abutting edges will not be broken.

It should be noted that adhesives are not necessary in constructing this container and thus the resulting container is suitable for aging liquors such as brandy and whiskey having a high alcohol content which is reactive with most known adhesives over the long time of aging that is typical for these beverages. The results are deleterious to the beverage and may be dangerous to the health of the consumer.

Cupping and dislocation between staves may develop because of the wetting of only one side of the stave if the staves, which have smooth edges, are held in the panel configuration only by the frictional forces developed by the in-plane compressive load. In order to prevent these distortions it may be sufficient only to provide a mechanical interlock between staves in a panel, and this can be provided by dowels or tongue-in-groove joints for example. As an alternative it may be beneficial to prestress the panels prior to container assembly by means of multiple pretensioned wires at the midplane of the panels.

Because of the planar configuration of the panels the sides can be reversed and the unused chemical activity in the wood can be utilized. This prolongs the useful life of the container when aging in "new" or unextracted wood. Particular varieties of wood such as Limousin Oak from France, are used to impart a unique complexity in flavour and aroma in the aged beverage, and since it is sometimes difficult to achieve the proper balance between these sensory effects and other effects desired in barrel aging, the proposed invention offers a means of control not available with conventional barrels. By properly choosing and mixing the wood varieties and previous usage of the panels, the proper level of wood extract can be obtained at the desired duration of aging.

Further economies and flexibility can be achieved by scraping the panels after use. Evidence exists, specifically for wine, that the extract activity of a used barrel can be reactivated by removing the thin layer of wood that was affected by the previous use. Thus the panel may be used not once but several times in order to produce the aging effect of new wood. A conventional barrel, because of configuration, is difficult to reactivate.

It can be noted also, that this proposal will result in a reduction of the depletion of a limited natural resource, which is white oak as the preferred material.

Where it is not necessary to impart the oak character to the beverage during the aging process, the reversability of the panels is not necessary and the sides may be joined in a permanent assembly.

Another approach to forming the panels or container will be to construct them with reconstituted wood fiber. The fiber can be molded under pressure and elevated temperature of about 350° F to form the complete panel or container. It is, of course, necessary to insure that the resulting product has essentially the same chemical and physical characteristics as natural wood in order to ensure that the aging process will proceed to the same end-point as obtained with natural wood.

Another version of construction which can be used is the formation of the panels from veneers or thin plies of wooden materials. In this version, it is only necessary that the interior ply in contact with the beverage be of the desirable material and sufficient thickness. The other plies can then be chosen to provide the necessary structual strength and diffusion characteristics. By proper choice of construction the resulting panel can be formed and provide the same chemical and physical environment as found with natural materials.

At 3 square feet of surface per cubic feet of volume, which is the typical for a traditional 48 gallon barrel, the proposed container will be approximately 2 feet on a side and contain 60 gallons. The increase in absolute volume will reduce the cellar operations such as "topping" or adding wine to the barrel to replace evaporation losses. The cubical shape will also provide an improvement in use of storage space. Whereas conventional barrels will realistically occupy 30% of the space required for storage, the cubical shape will utilize up to 50% of the space. Thus significantly more volume of stored material can be accomodated on a given space by adopting the cubical shape.

Other cellar operations would benefit from this choice also. Care of the demounted panels between uses has marked advantages over the regime required for barrels. When not in use, barrels must be carefully stored and maintained in order to prevent deterioration and shrinkage of staves which would cause subsequent leakage. In addition the storage space for an empty barrel is only a little less than the barrel that is filled and in productive use. However, with the proposed container constructed with demountable panels, the panels may be dismounted after use, cleaned, dried, and stacked without any further attention until the next usage. The space required for storage of shipping of the disassembled container will therefore be much less than the assembled container.

It will also be noted from an inspection of FIGS. 1 and 3 that the head members form a support, much like a pallet, to space the barrel above the floor or like surface and permits stacking. This spacing provides for ventilation and access to the top and bottom surfaces.

Various changes and modifications may be made in this invention as will be readily apparent to those skilled in the art. Such changes and modifications are within the scope and teaching of this invention as defined by the claims appended hereto.

What is claimed is:

1. A box-like container for the aging of alcoholic beverages and the like, said container being comprised of six rectangular planar panels, any three mutually adjacent panels being mutually perpendicular to each other and defining a corner of said container, any one panel contacting an adjacent panel in face to edge relation and the third panel of any three mutually adjacent panels in edge to face relation, the rectangular panels meeting at each corner in overlapping face to edge relation and leaving a cubical gap at said corner and a plug means provided at said gap to prevent leakage at said corner all of said panels and the plug means being held in tight box-like form by a prestressing means to provide liquid tight contact at the face to edge and edge to face juncture of said panels.

2. The container of claim 1 in which the prestressing means comprises clamps adapted to tighten opposed panels bearing against an intermediate panel which meets said opposed panels in edge to face relation said clamps comprising head members and said head members being prestressed in a parabolic pattern to provide a substantially uniform loading at the line of contact between the head and the panel.

3. The container of claim 2 in which a wire rope is passed over the head members in a parabolic pattern and is tensioned to provide the aforementioned substantially uniform loading.

* * * * *